US009140019B2

United States Patent
Lerch et al.

(10) Patent No.: US 9,140,019 B2
(45) Date of Patent: *Sep. 22, 2015

(54) FACADE COVERING PANEL MEMBER

(71) Applicant: Henry Molded Products Inc., Lebanon, PA (US)

(72) Inventors: David P. Lerch, Lebanon, PA (US); Ian Gumbert, Mount Gretna, PA (US)

(73) Assignee: Henry Molded Products Inc., Lebanon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,384

(22) Filed: Mar. 15, 2013

(65) Prior Publication Data

US 2013/0216797 A1    Aug. 22, 2013

Related U.S. Application Data

(63) Continuation-in-part of application No. 13/212,720, filed on Aug. 18, 2011.

(51) Int. Cl.
| | |
|---|---|
| *E04C 2/08* | (2006.01) |
| *E04F 13/08* | (2006.01) |
| *D21H 27/18* | (2006.01) |
| *E04F 13/18* | (2006.01) |
| *B29L 31/10* | (2006.01) |
| *B29C 51/10* | (2006.01) |

(Continued)

(52) U.S. Cl.
CPC ............ *E04F 13/0871* (2013.01); *D21H 27/18* (2013.01); *E04F 13/185* (2013.01); *B29C 51/10* (2013.01); *B29C 2791/006* (2013.01); *B29K 2003/00* (2013.01); *B29K 2105/12* (2013.01); *B29L 2031/102* (2013.01); *B29L 2031/104* (2013.01); *B29L 2031/776* (2013.01); *Y10T 428/24802* (2015.01); *Y10T 428/24934* (2015.01)

(58) Field of Classification Search
CPC ................ F16B 5/00; D21J 3/00; E04B 1/04; E04B 1/16; E04C 2/38; E04F 13/08; E04F 13/0871
USPC ........................ 162/218; 83/522.15, 821–829; 428/211.1, 195.1; 264/42
See application file for complete search history.

(56) References Cited

U.S. PATENT DOCUMENTS

| | | | | |
|---|---|---|---|---|
| 2,377,864 | A | * | 6/1945 | Chaplin ........................ 162/219 |
| 2,847,721 | A | | 8/1958 | Diamond |
| 3,325,302 | A | | 6/1967 | Hosfeld |

(Continued)

OTHER PUBLICATIONS

Pulp Art Surfaces Catalog, Faux brick, stone, cement block surface panels 100% recycled materials, http://pulpartsurfaces.com/product-line/catalog, Copyright 2011, 10 pages.

(Continued)

*Primary Examiner* — Beth Stephan
(74) *Attorney, Agent, or Firm* — Barley Snyder

(57) ABSTRACT

A panel member prepared from a fibrous slurry and replicates a structure prepared from masonry, carpentry, or other finishes. The panel member includes a body, a plurality of ornamental sections, a plurality of interior filler sections, an exterior filler section, and a plurality of quality control elements disposed along the exterior filler section. The body is prepared from a substantial uniform caliper of fiber material.

19 Claims, 8 Drawing Sheets

(51) Int. Cl.
  *B29L 31/00* (2006.01)
  *B29K 105/12* (2006.01)

(56) References Cited

U.S. PATENT DOCUMENTS

| | | | |
|---|---|---|---|
| 3,795,721 A | | 3/1974 | Gilbert et al. |
| 4,275,540 A | | 6/1981 | Keller |
| 4,656,722 A | | 4/1987 | Armstrong |
| 5,372,676 A | * | 12/1994 | Lowe ............................... 216/30 |
| 5,885,502 A | | 3/1999 | DeAngelis et al. |
| 6,083,447 A | | 7/2000 | Turner |
| 6,355,193 B1 | | 3/2002 | Stott |
| 7,067,041 B2 | * | 6/2006 | Tsuura et al. ................. 162/218 |
| 7,582,190 B2 | | 9/2009 | Salm |
| 7,587,871 B2 | | 9/2009 | Perry |
| 7,931,248 B2 | * | 4/2011 | Korwin-Edson et al. ....... 249/55 |
| 2005/0150624 A1 | | 7/2005 | Toh et al. |
| 2007/0034346 A1 | | 2/2007 | Salm |
| 2008/0155922 A1 | * | 7/2008 | Wolf et al. ...................... 52/386 |
| 2008/0155938 A1 | | 7/2008 | Attebery |
| 2009/0283235 A1 | | 11/2009 | Salm |

OTHER PUBLICATIONS

Pulp Art Surfaces, How It's Made, Faux brick, stone, cement block surface panels 100% recycled materials, http://pulpartsurfaces.com/pulp-1-2-3, Copyright 2011, 7 pages.
Pulp Art Surfaces, http://pulpartsurfaces.com, PAS004 "New" New York Brick, The Only Eco-Wall Skin, Copyright 2011, 6 pages.
MIO Company, LLC, Paperforms, Papertastic, http://mioculture.com/paperforms.html, 2010 MIO Company, LLC, telephone 215-925-9359, 2 pages.
Pulp Art Surfaces Technical Guide, pulpartsurfaces.com, 7 pages, May 27, 2011.
Pulp Art Surfaces, "The Only Eco Wall Skin", pulpartsurfaces.com, May 27, 2011.
Pulp Art Surfaces, PAS 002, May 27, 2011, pulpartsurfaces.com 1 page, May 27, 2011.
Pulp Art Surfaces, PAS 003, May 27, 2011, pulpartsurfaces.com 1 page, May 27, 2011.
Pulp Art Surfaces, PAS 004, May 27, 2011, pulpartsurfaces.com 1 page, May 27, 2011.
Pulp Art Surfaces, PAS 005, May 27, 2011, pulpartsurfaces.com 1 page, May 27, 2011.
Pulp Art Surfaces, PAS 006, May 27, 2011, pulpartsurfaces.com 1 page, May 27, 2011.
Pulp Art Surfaces, PAS 007, May 27, 2011, pulpartsurfaces.com 1 page, May 27, 2011.
Pulp Art Surfaces, PAS 008, May 27, 2011, pulpartsurfaces.com 1 page, May 27, 2011.
Pulp Art Surfaces, PAS 010, May 27, 2011, pulpartsurfaces.com 1 page, May 27, 2011.
CBS Studio Center Newsletter, Pulp Art Surfaces article, 6 pages, Dec. 2009.
Perspective Magazine, Pulp Art Surfaces article, 7 pages, Mar. 2010.
Wall Skin Facts, Pulp Art Surfaces, 6 pages, PAS 003—Mar. 25, 2010, PAS 004—Apr. 8, 2010, PAS 005—Aug. 17, 2010.
PCT Notification, Search Report and Written Opinion, International Application No. PCT/US2014/027143, dated Aug. 13, 2014, 11 pages.

* cited by examiner

FACADE COVERING PANEL MEMBER

CROSS-REFERENCE TO RELATED APPLICATIONS

This application claims is a Continuation-in-Part (CIP) of U.S. patent application Ser. No. 13/212,720, filed Aug. 18, 2011.

FIELD OF INVENTION

This invention relates to a facade covering panel member and, in particular, to a wall covering panel made of molded fiber material having a plurality of quality control elements.

BACKGROUND

The practice of covering an interior wall or an exterior wall for aesthetic purposes (i.e. stone, brick, wood panels, tile, etc.) has traditionally involved standard masonry, carpentry, or finishing practices, where a stone mason, carpenter, or other finisher arranges stones, bricks, wood panels, tile or other decorative features onto the wall and sets them in place using mortar, paste, adhesive or nails. The process of arranging and adhering this facade, which may include random shapes and sizes, is tedious and requires substantial skill. As a result, attempts have been made to simulate such a trade using less expensive materials and less labor-intensive methods. One such attempt involves constructing a wall from concrete. The concrete may be molded to the shape of stone, bricks, tile, wood panels or other decorative feature. Another such example includes manually texturing the concrete before it cures. One problem with using concrete is that concrete tends to have a substantially smooth texture, unlike natural stone or brick. Another disadvantage with such concrete walls is that solid concrete is also extremely heavy.

In other attempts, wall facades have been manufactured from synthetic resins, such as a plastic, fiberglass, or styrene foams, which are formed to conform with the outer shape of the products to provide an appearance of masonry, carpentry, or other finishes. While plastic and styrene resin foams are light in weight and inexpensive to manufacture, their use is an environmental concern because they are not perishable and do not naturally decompose in landfills. Furthermore, these plastic facades are generally bulking and brittle.

One alternative material to plastics, which has been found to be suitable for use in packing or cushioning material, is a molding prepared from a mixture of water and paper, form a fibrous pulp slurry. The fibrous pulp slurry can be molded into finished articles having a plurality of contoured shapes. Such molded member are relatively inexpensive to produce in large quantities, are biodegradable, and are easy to work with. Accordingly, the use of such molding processes for faux facades is highly desirable.

Molded members formed from a fibrous slurry, such as a pulp slurry, are typically produced by the process of matting the slurry fibers onto one side of a forming die by first inserting the die into the slurry. A vacuum is then applied in such a manner that the water held in the slurry passes through a screen having perforations and through channels in the die. As a result, a layer of wet fibers deposited on the die surface is left, and after sufficient water has been drawn to obtain the required thickness of the fiber layer, the die is removed from the slurry. The formed molded article can then be removed from the forming die, and then the molded member can be dried for further finishing, including die cutting, and packaging.

One problem associated with producing large molded articles from a fibrous slurry, such as a wall covering panel member, is the need to prevent warping that may prevent the panel member from looking like a realistic faux surface. Furthermore, there is a need to have the wall covering panel member edges and other elements line up as perfectly as possible during assembly. Therefore, improved die cutting is required in order to eliminate warpage, expansion and shrinkage as much as possible.

SUMMARY

The present invention has been devised to solve the technical problems described above, and an object of the present invention, among others, is to provide a large wall covering panel made of a thin layer of fibrous slurry that does not warp when assembled onto a wall surface. The panel member includes a body, a plurality of ornamental sections, a plurality of interior filler sections, an exterior filler section, and a plurality of quality control elements disposed along the exterior filler section. The body is prepared from a substantial uniform caliper of fiber material.

BRIEF DESCRIPTION OF THE DRAWINGS

The invention will now be described by way of example with reference to the accompanying figures of which.

DETAILED DESCRIPTION OF THE EMBODIMENT(S)

Figure 1:
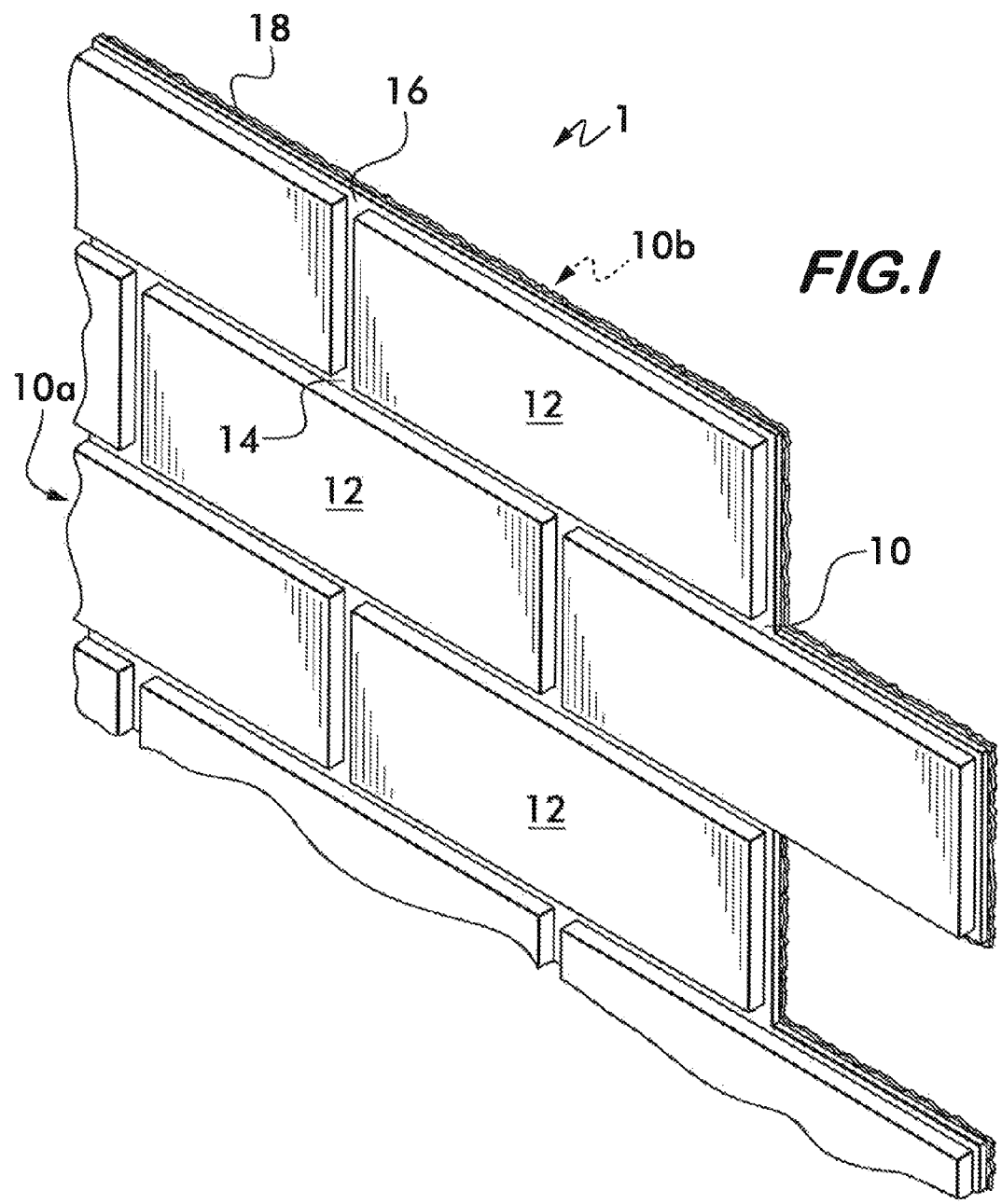
FIG. 1 is a close-up perspective view of a panel member according to the invention.
Figure 2:
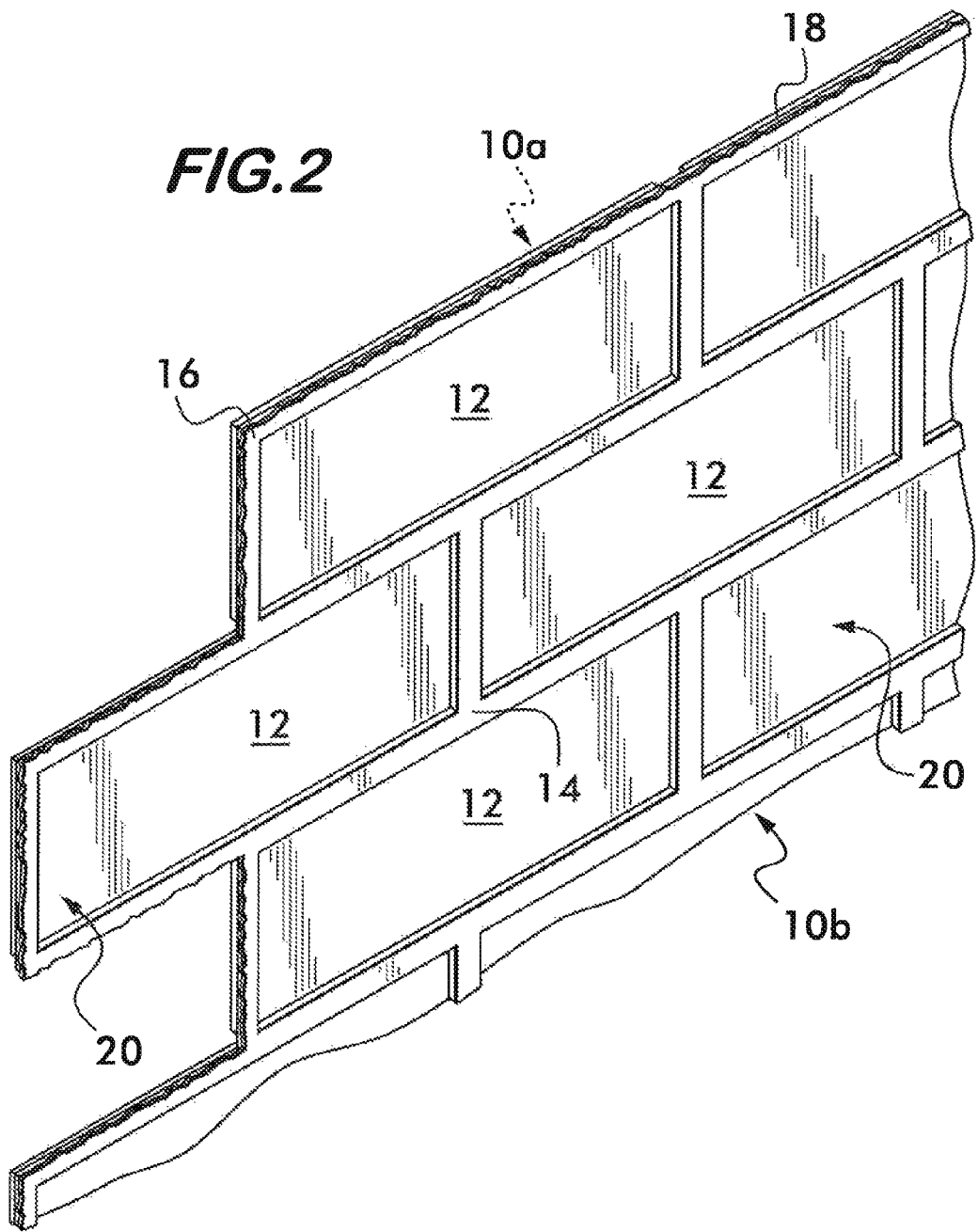
FIG. 2 is a close-up perspective view of the panel member in FIG. 1, showing a rear surface.

Referring to FIGS. 1-4, a panel member 1 according to the invention is shown, having a body 10, a plurality of ornamental sections 12, a plurality of interior filler sections 14, an exterior filler section 16, and flashing 18 extending from the exterior filler section 16.

The panel member 1 is prepared from a uniform layer of fiber material, which may be paper or other fibrous material. In fact, there are numerous organic and inorganic materials, in fiber form, that may be used instead of or included with paper fibers in a fiber material for the panel member. In one embodiment, the fiber material is originally a pulp slurry using pre- and post-consumer newsprint, kraft paper and other selected waste papers which are fed into a pulping machine and mixed with water. The recycled paper is reduced to small pieces and then further defibered into a homogenized slurry of paper and water. During defibering, dry pulp sheets or paper are added with water and continuously agitated such that the dry pulp sheets or clean recycle paper sheets are broken down and separated into fibers, that is, to separate all of the fibers. Other additives may also combined with the slurry, including sizing agents (i.e. waxes) and binders to ensure proper binding of all the additives. It is also possible to use other fibrous materials. However, using 100% pre- and post-consumer newsprint, kraft paper and other selected waste papers, the panel member 1 remains economical and environmentally friendly. As a result, the panel members 1 are lightweight and quite manageable; the panel member 1 may be recycled in a convenient manner.

The panel member 1 may be provided in various shapes, sizes and thicknesses. In the embodiment shown, the panel member 1 is substantially 4'½" long and 5'-10" wide. As a result, the panel member 1 should be thick enough so the panel member 1 can be easily manageable for installation onto a wall or ceiling. Furthermore, the thickness will affect any warping once the panel member 1 is installed. Accordingly, the panel member 1, as shown, includes a nominal caliper of ¼".

The body 10 is formed from a dried slurry, and includes an upper surface 10a that is smooth and a lower surface 10b that is left naturally rough. This shape and roughness is dependent and results from the molding process, which is described in more detail below. The thickness of the upper and lower surfaces 10a, 10b are controlled by the molding process. However, depending on the shape of the ornamental sections 12, which depends on the type of brick, rock, wood, or other façade surfaces being replicated, the body 10 may have more or less relief, which provides better replication of masonry, carpentry, or other finishes.

As shown in FIG. 1, the ornamental sections 12 extend outward from the interior and exterior filler sections 14, 16 and are formed in the shape of blocks, stone, wood panels, or other decorative features. This provides an appearance that the ornamental sections 12 are separate and/or bound together by connecting seams (i.e. mortar, grout, or other known seams), which is replicated by the interior and exterior filler sections 14, 16. In the alternative, the interior and exterior filler sections 14, 16 may be positioned between the ornamental sections 12 such that replicate an appearance is prepared wherein the ornamental sections 12 seem bound together through a seamless connection (i.e. floating floor tiles, tin panels, etc.).

In FIGS. 1-4, the panel member 1 has ornamental sections 12 shaped as bricks, while the interior and exterior filler sections 14, 16 are shaped and dimensions to replicate brick mortar, having a straight lines and uniform dimensions (i.e. uniform grid pattern). Other materials, which are commonly used in building structures and having ornamental features, may be replicated, including granite, travertine, limestone, concrete block, glass block, stucco, tile, metal panels, or even timber. In other embodiments, the interior and exterior filler sections 14, 16 are formed to replicate grout, paste, concrete grout, or other spacing features known between the ornamental sections 12. As discussed above, in the alternative, the interior and exterior filler sections 14, 16 may replicate the appearance of a seamless connection (i.e. floating floor tiles, tin panels, etc.).

Figure 5:
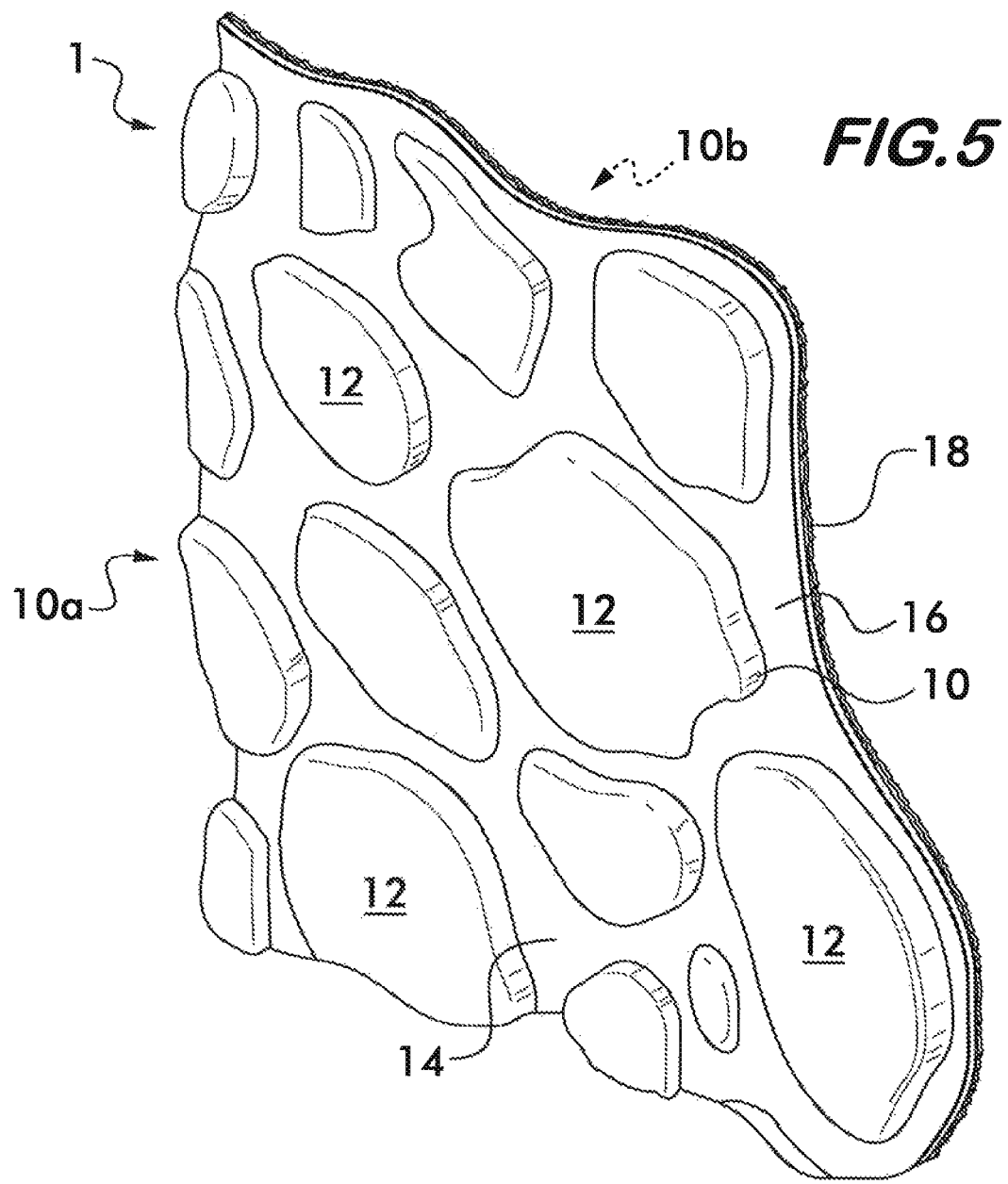
FIG. 5 is a close-up perspective view of another panel member according to the invention.
Figure 6:
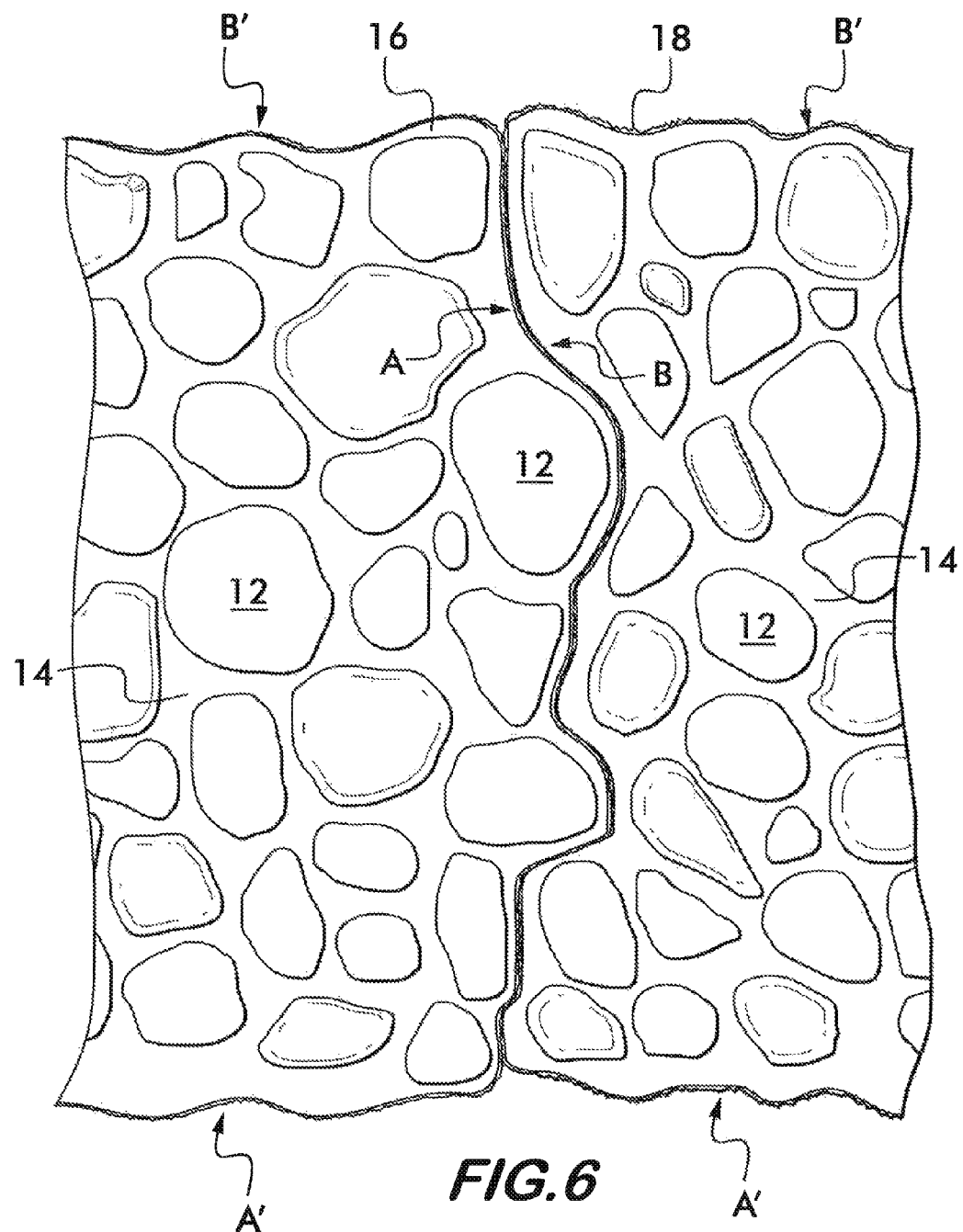
FIG. 6 is a front view of connecting panel members according to FIG. 5, showing interlocking sections between the panel members.

While the ornamental sections 12 are generally symmetrical in the embodiment shown, the ornamental sections 12 may be arranged in different shapes. For instance, the ornamental sections 12 may replicate bricks laid in a variety of 'bonds' or patterns of headers and stretchers on a series of courses, tile, or wood panels pieced together in a specific pattern. It is also possible that the ornamentals sections are molded like ceramic tile with grout there between. The ornamental sections 12 may be shaped differently. In FIGS. 5 and 6, the ornamental sections 12 are shaped like rock sections of a stone wall, having irregularity in shape, surface relief, and texture. The interior and exterior filler sections 14, 16 are more irregular in shape than the interior and exterior filler sections 14, 16 in FIGS. 1-4, and replicate a mortar mix and design commonly used in the stone wall masonry.

With reference back to FIG. 2, the ornamental sections 12 are hollow, and a cavity 20 is formed along the lower surface 10b of the body 10 and between the interior and exterior filler sections 14, 16. This allows the panel member 1 overall weight to be reduced, which makes the panel member 1 more manageable to install. However, since the overall weight of panel member 1 is reduced, the panel member 1 becomes more susceptible to becoming warped that provides a poor appearance of replication. As a result, the filler sections 14, 16 are structured and dimensioned to provide support to the panel member 1 and minimize warping. As discussed, the interior and exterior filler sections 14, 16 are formed to replicate grout, paste, concrete, or spacing between the ornamental sections 12.

In the embodiment shown, the interior filler sections 14 and the exterior filler sections 16 are generally the same thickness. However, according to the invention, the thickness of the exterior filler sections 16 cannot be larger than the thickness Tg of the interior filler sections 14. If the exterior grout lines 16 are thicker, then the panel member 1 warps. Additionally, the thickness of the exterior filler sections 16 cannot be smaller than the thickness Tg of the interior filler sections 14. If the exterior grout lines 16 is substantially smaller, then the panel member 1 warps also. An interior section of the body 10 either bows in or out depending on this design and variation, which provides a poor appearance and the panel member does not look like a wall prepared from masonry. As shown in FIG. 4, the interior filler section thickness $T_g$ is substantially equal to the ornamental section thickness $T_o$, which results from the ornamentals sections 12 being hollow and the molding process as further detailed below. The body thickness Tb is measured from the upper surface 10a to the lower surface 10b, and is equal to the interior filler section thickness $T_g$ and the ornamental section thickness $T_o$, since the flashing 18 is an extension from the exterior filler section 16 and directed parallel to the upper and lower surfaces 10a, 10b of the body 10.

Generally, flash is formed during the molding process, which is excess material attached to a molded, forged, or cast product, which must usually be removed. This is typically caused by leakage of the material between the two surfaces of a mold or between the base material and the mold.

While the exterior filler section 16 thickness is substantially equal to a thickness of the interior filler sections 14, the exterior filler section 16 width $W_e$ is less than the interior filler sections 14 with $W_i$. As shown in FIG. 4, since the flashing 18 is directed away from the exterior filler section 16, connection between adjacent panel members 1 may be hindered or forcibly limited by the width of the flashing 18 and exterior filler section 16. Accordingly, the exterior filler section 16 width $W_e$ is limited to substantially half that of the interior filler section 14 width $W_i$. However, it is possible that other dimensions are possible, as long as the exterior filler section 16 width $W_e$ is less than that of the interior filler section 14 width $W_i$.

When molding the panel member 1 from a fibrous slurry, flash will develop, like most molding processes. In most instances, where one mold is used, a flashing is generally directed perpendicular with respect to the to the upper and lower surfaces 10a, 10b of the body 10. This creates an uneven installation surface against a wall, ceiling, or other structure, because the flashing is not uniform and does not allow the panel member 1 to lay flat.

The process of removing flash, known as deflashing, is commonly performed via cutting, breaking, grinding, or tumbling. Some foundries use robot autogrinders to remove this unwanted material. However, removal of the flashing requires additional steps which are cumbersome, time consuming, and expensive. In the embodiment shown and according to the invention, the flashing 18 is directed parallel to a planar upper surface 10a of the body 10. The flashing 18 does not affect the warping because the flashing 18 is directed away from the body 10 and is small enough to impede connection between the adjacent panel members 1, considering that the exterior filler section 16 width $W_e$ is less than that of the interior filler section 14 width $W_i$.

Figure 3:
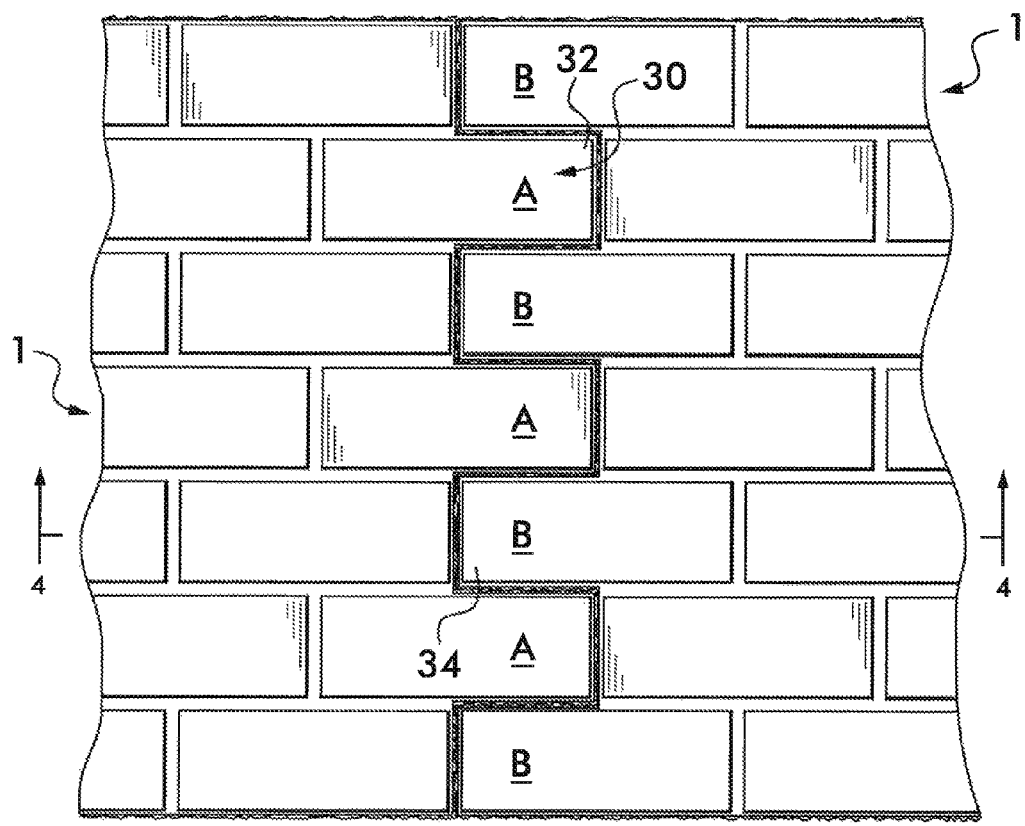
FIG. 3 is a front view of connecting panel members according to the invention, showing interlocking joints between the panel members.
Figure 4:
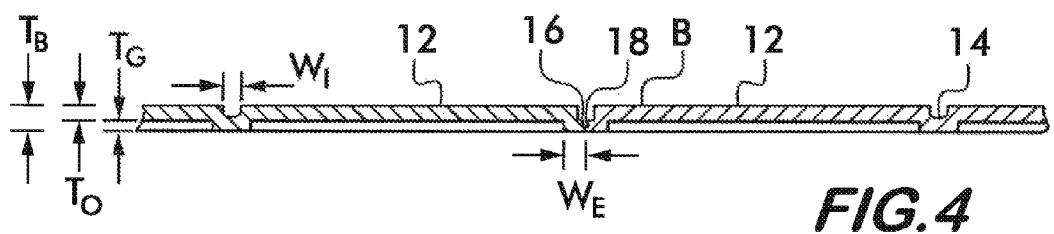
FIG. 4 is a sectional view of the connecting panel members, along the 5-5 line.

With reference to FIGS. 3 and 4, panel members 1 are shown connecting to each other.

For each panel member 1, opposing sides (not top or lower surfaces 10a, 10b) have either a first connection section A or a second connection section B. The first connection section A is keyed to connection section B, and vice versa. Accordingly, when the first connection section A of one panel member is positioned adjacent to a second connection section B of another panel member 1, then the first and second connection sections A, B come together, and compliment a connection between the connecting panel members 1.

As shown, the first and second connection sections A, B include finger joints 30, which are complementary rectangular protrusions 32 and cuts outs 34, which interlock finger joints 30 in an adjacent panel member 1. Again, since the flashing 18 is directed parallel to a planar upper surface 10a of the body 10 and minimized, and the exterior filler section 16 width $W_e$ is less than that of the interior filler section 14 width $W_i$, the first and second connection sections A, B of adjacent panel members 1 can be performed, and provide a realistic look of a structure prepared from masonry, carpentry, or other finishes.

With respect to FIGS. 5 and 6, another embodiment of the invention is shown, wherein the panel member 1 includes body 10, a plurality of ornamental sections 12, a plurality of interior filler sections 14, an exterior filler section 16, and flashing 18 extending from the exterior filler section 16, but the first and second connection sections A, B are profiled differently than the embodiment shown in the FIGS. 1-4. In fact, the first and second connection sections A, B may be a keyed profile side, that match a corresponding first and second connection section A, B from an adjacent panel member 1 when positioned next to each other. There are no finger joints 30.

For panel members 1, which have a more grid pattern, it is possible to only have two connection sections A, B, on opposing sides of the panel member. However, as shown in FIGS. 5 and 6, the panel member may have first and second connection sections A, B positioned on all sides of the body 10. As a result, a panel member 1 that replicates a stone wall, for instance, could match with adjacent panel members 1 in different ways, creating a less uniform and consistent look.

Figure 7:
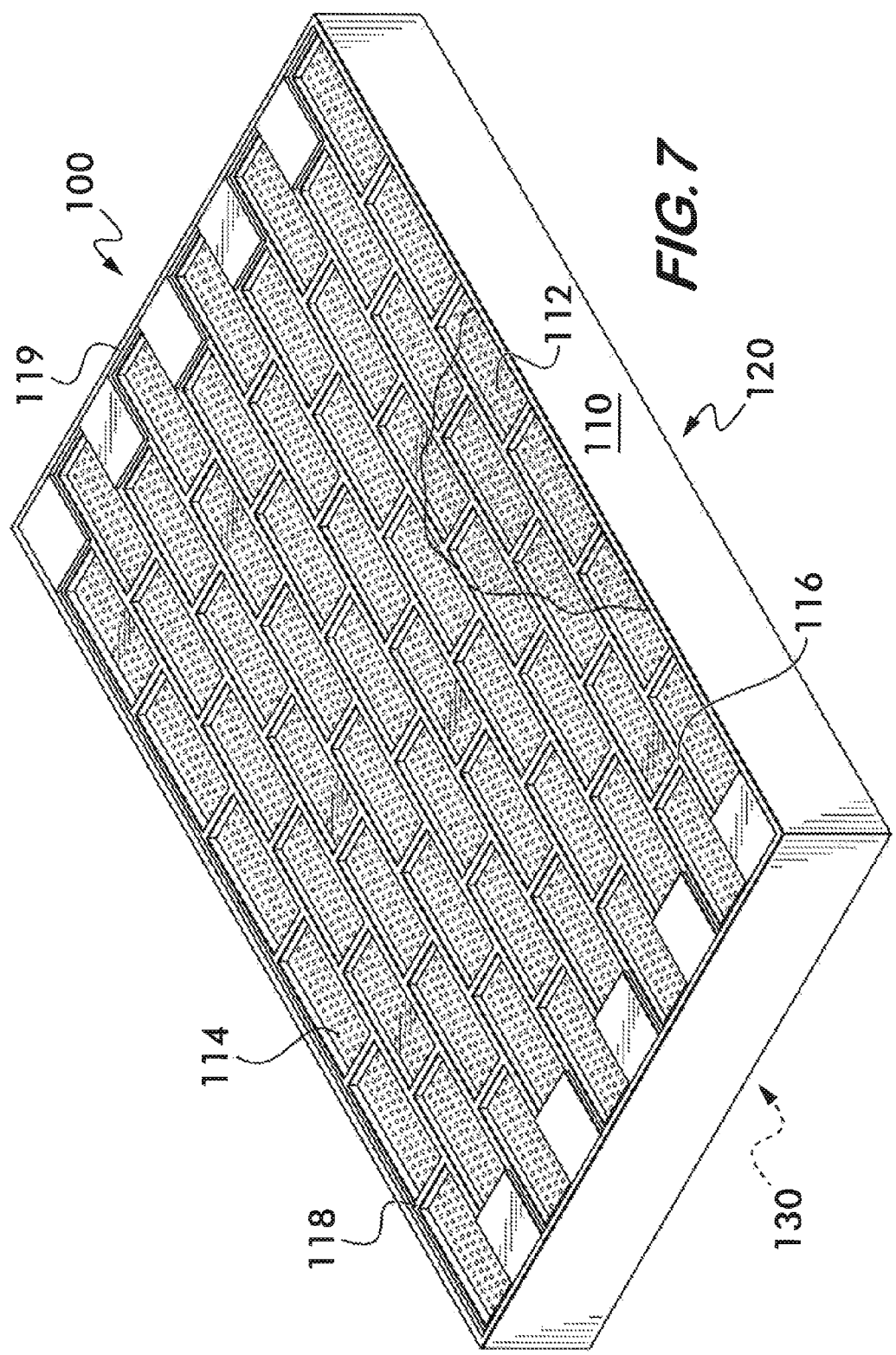
FIG. 7 is a perspective view of a mold used to prepare a panel member according to the invention.

Referring now to FIG. 7, the apparatus for molding panel members 1 from a fibrous slurry, generally designated 100, of the subject invention is shown comprising a die 110 having molding screen 112, and a vacuum mechanism 130 for drawing slurry into the die 110 and further extracting water away from the slurry.

The die 110 may be formed from any material having the characteristics of being water-insoluble and porous. The material must also be sufficiently rigid to withstand the required vacuum pressures and easily shaped to permit the molding surfaces of the die 110, contrary to the accepted practice, to be constructed either by hand using simple hand-held cutting tools, or by machine using relatively simple manual tools, or automatically using computer controlled cutting tools. Such materials include, but are not limited to, phenol-formaldehyde resin foams, polyurethane resin foams, and urea-formaldehyde resin foams; ceramics; foam metals; and other similar materials. Accordingly, the die 110 of the invention may be manufactured with significantly less time and cost than conventional forming dies which require relatively labor intensive, time consuming, and expensive molding, machining and drilling, or electroforming operations. Further, it should now be apparent that the use of materials having the above-described characteristics permits the die 110 of the invention to be easily and inexpensively modified to allow for formed articles to be manufactured incorporating various design changes.

In the embodiment shown, the die 110 includes a screen 112 and a plurality of perforations 114 extending inward and through the die 110. These perforations 114 lead through the die 110 as a channel that then connects with the vacuum mechanism 130.

The screen 112 is a fine mesh that provide a smooth upper surface 10A of the body 10, and allows the water to pass through the perforations 114 when sucked by the vacuum mechanism 130. The screen 112 prevents the fiber material from also being sucked through the perforations. The screen 112, the perforations 114, and the vacuum mechanism 130 allow the fiber material to mold to the die 110 surface and then remove enough water from the fiber material to allow the molded fibers to self support itself once it is removed from the die 110.

The die 110 also includes interior filler walls 116, exterior filler walls 118, and a support wall 119. The interior filler walls 116 form the interior filler sections 14, while the exterior filler walls 118 form exterior filler sections 16. In accordance with the description above, the interior filler sections 14 and the exterior filler sections 16 are generally the same thickness, and so do the interior filler walls 116 and the exterior filler walls 118. However, according to the invention, the thickness of the exterior filler sections 16 cannot be larger than the thickness Tg of the interior filler sections 14. If the exterior grout lines 16 are thicker, then the panel member 1 warps. An interior section of the body 10 either bows in or out, which provides a poor appearance and the panel member 1 does not look like a wall or façade prepared from masonry, carpentry, or other finishes. Therefore, the exterior filler walls 118 must have less or equal height than the interior filler walls 116. Furthermore, the exterior filler walls 118 should have a width less than the width of the interior filler walls 116. The upper surface 10a of the body 10 is formed along the screen 112, and the cavities 20 are formed between the interior filler walls 116.

The support wall 119 is formed on the external wall of the die 110 and determines the height and shape of the flash. Accordingly, the support wall 119 height is limited to the height less than the height of the exterior filler wall 118. The flashing 18, as a result, is limited in height and directed parallel to the upper and lower surfaces 10a, 10b of the body 10.

Figure 8:
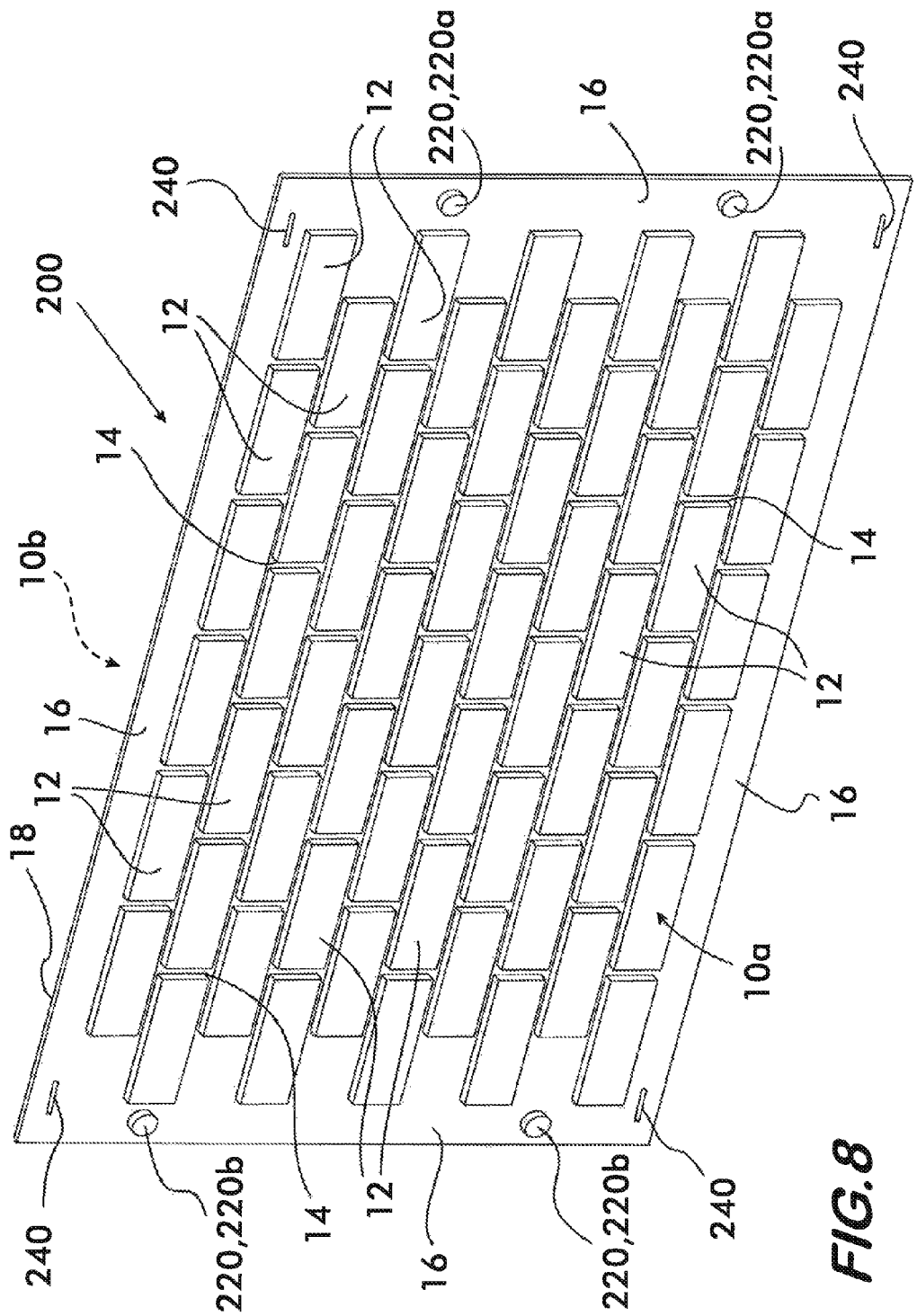
FIG. 8 is a front view of another panel member according to the invention.

Now with reference to FIGS. 8, another panel member 200 according to the invention is shown, which further includes a plurality of quality control elements, such as a plurality of die cutting locators 220 and a plurality of dimensional calibrators 240 in the shown embodiment. For the sake of brevity, like parts of the body 10, the plurality of ornamental sections 12, the plurality of interior filler sections 14, the exterior filler section 16, and finger joints 30, as previously discussed and shown in FIGS. 1-6, will be omitted and only those features that are distinguished from the embodiment shown in FIG. 8 will be described.

As shown in FIG. 8, the panel member 200 is different than the panel member 1 (see FIGS. 1-6), in that the panel member 200 avoids problems associated with normal material flashing (problem described above) and provides a means for consistent cutting of panel member 200 edges by cutting die (not shown) during subsequent manufacturing steps.

As shown in FIG. 8, the panel member 200 incorporates the plurality of die cutting locators 220 along the exterior filler section 16, which extends further outward from the plurality of ornamental sections 12 than the panel member 1 shown in FIGS. 1-6.

As shown in FIG. 8, each die cutting locator 220 extends outward from a top surface of the exterior filler section 16. In the exemplary embodiment, each die cutting locator 220 is shaped as a cylindrical protrusion. In the shown embodiment, the die cutting locator 220 has a height equal to or less than a height of the ornamental sections 12. However, each die cutting locator 220 could be formed from other shapes, as long as the die cutting locator 220 corresponds with the locator receiving notches in the cutting die. As a result, the die cutting locator 220 dimensions can vary, and depend on the shape and placement of the die cutting locator 220.

Each die cutting locator 220 is hollow, having a cavity (not shown) formed along the lower surface 10b of the body 10 and between the interior and exterior filler sections 14, 16. The cavity is similar to what is shown of the ornamental sections 12 shown in FIGS. 2 and 4. This allows the panel member 200 overall weight to be reduced, which makes the panel member 200 more manageable to install. However, in other embodiments, it is possible that each die cutting locator 220 is not hollow.

As shown in FIG. 8, the die cutting locator 220 protrudes from the top surface. However, in another embodiment, it is possible that the die cutting locator 220 extends from a lower surface of the exterior filler section 16, away from the plurality of ornamental sections 12. In yet another embodiment, the die cutting locator 220 could be a recess extending through the exterior filler section 16. Accordingly, for either embodiment, the cutting die would include a locator protrusion (not shown) that replaces the locator receiving notch so that the locator protrusion corresponds with the die cutting locator 220 that extends from the lower surface In the shown embodiment, the panel member 200 includes two pairs of die cutting locators 220, including a first pair of die cutting locators 220a positioned adjacent a first set of finger joints 30 of panel member 200, and a second pair of die cutting locators 220b positioned adjacent a second set of finger joints 30 opposite the first set of finger joints 30. The first pair of die cutting locators 220a are positioned apart from each other along an opposite side of the panel member 200 than the second pair of die cutting locators 220b, which too are positioned separate from each other.

In the shown embodiment, each die cutting locator 220 is positioned between an edge of the panel member 200 and an edge of the finger joint 30, so that exterior filler section 16 is left between the finger joints 30 and the die cutting locator 220.

The first pair of die cutting locators 220a are positioned closer to each other, by distance, than the second pair of die cutting locators 220b are positioned to each other. As a result, the plurality of die cutting locators 220 are asymmetrically positioned along opposite sides of the panel member 200.

As shown in FIG. 8, the plurality of ornamental sections 12 are staggered, and therefore, opposite sides of the panel member 200 are not symmetrical. By positioning the plurality of die cutting locators 220 asymmetrically, the chance of improperly placing the panel member 200 in a cutting die is minimized since the panel member 200 can only match the cutting die (not shown) using a single alignment position.

According to the invention, each die cutting locator 220 is positioned and shaped so that the panel member 200 properly aligns with the cutting die (not shown). In the shown embodiment, the plurality of die cutting locators 220 are asymmetrically aligned along sides of the panel member 200. However, one skilled in the art should appreciate that the design is not limited to this. Rather, different shapes can be used of one or more of the die cutting locators 220, so that they are keyed with corresponding features of cutting die. The panel member 200 can then be properly positioned as the die cutting locators 220 are keyed with the cutting die.

During subsequent step, the exterior filler section 16 is uniformly cut by the cutting die with the assistance of the die cutting locators 220. Instead of directing the flashing in the same direction as the exterior filler section 16, as in the panel member 1, the panel member 200 is die cut during subsequent steps in order to provide smooth consistent edging, which removes the flashing completely. Additionally, by providing consistent die cut edges, adjoining panel members 200 seamlessly align with each other during assembly.

In particular, the plurality of die cutting locators 220 correspond locator receiving notches (not shown) that are disposed in the cutting die (not shown). As a result, the corresponding features of the panel member 200 and the cutting die (not shown) make it possible to avoid an errors in positioning the panel member 200 in the cutting die. Notably, positioning and shape of the die cutting locators 220 require a match with corresponding locator receiving notches in the cutting die. This provides optimal alignment of the panel member 200 during subsequent die cutting. Accordingly, problems with the flashing are avoided, and the panel member 200 can be cut to provide uniform and consistent edges of the exterior filler section 16.

Now with reference back to FIG. 8, the plurality of dimensional calibrators 240 are shown, and also positioned along the exterior filler section 16 of the panel member 200. In particular, in the shown embodiment, each dimensional calibrator 240 is positioned adjacent corners of the panel member 200 and separate from the plurality of die cutting locators 220.

As shown in FIG. 8, each dimensional calibrator 240 is an elongated indentation formed in the exterior filler section 16. In the exemplary embodiment, the dimensional calibrator 240 is dimensioned to receive a tape measure or an equivalent. However, the dimension and shape of the dimensional calibrator 240 can vary. For instance, the dimensional calibrator 240 could be an elongated protuberance extending across the exterior filler section, or even a recess extending through the exterior filler section 16.

In the shown embodiment, each dimensional calibrator 240 is used to enable adjustments in the drying process so variations in the panel member 200 are within specified dimensional tolerances in the final consumer product. For instance, each dimensional calibrator 240 has a set length that corresponds to a length (from side to side) of the panel member 200. As the length of the panel member 200 shortens during drying, which may indicate shrinkage or warpage, the length of the dimensional calibrator 240 changes. Therefore, an operator can measure the dimensional calibrators 240 (1) first after molding, and (2) then during subsequent manufacturing steps (i.e. drying process) to control over-shrinkage and warping of the panel member 200. As a result, the size of the panel member 200 can be maintained according to accepted dimensional tolerances.

Figure 9:
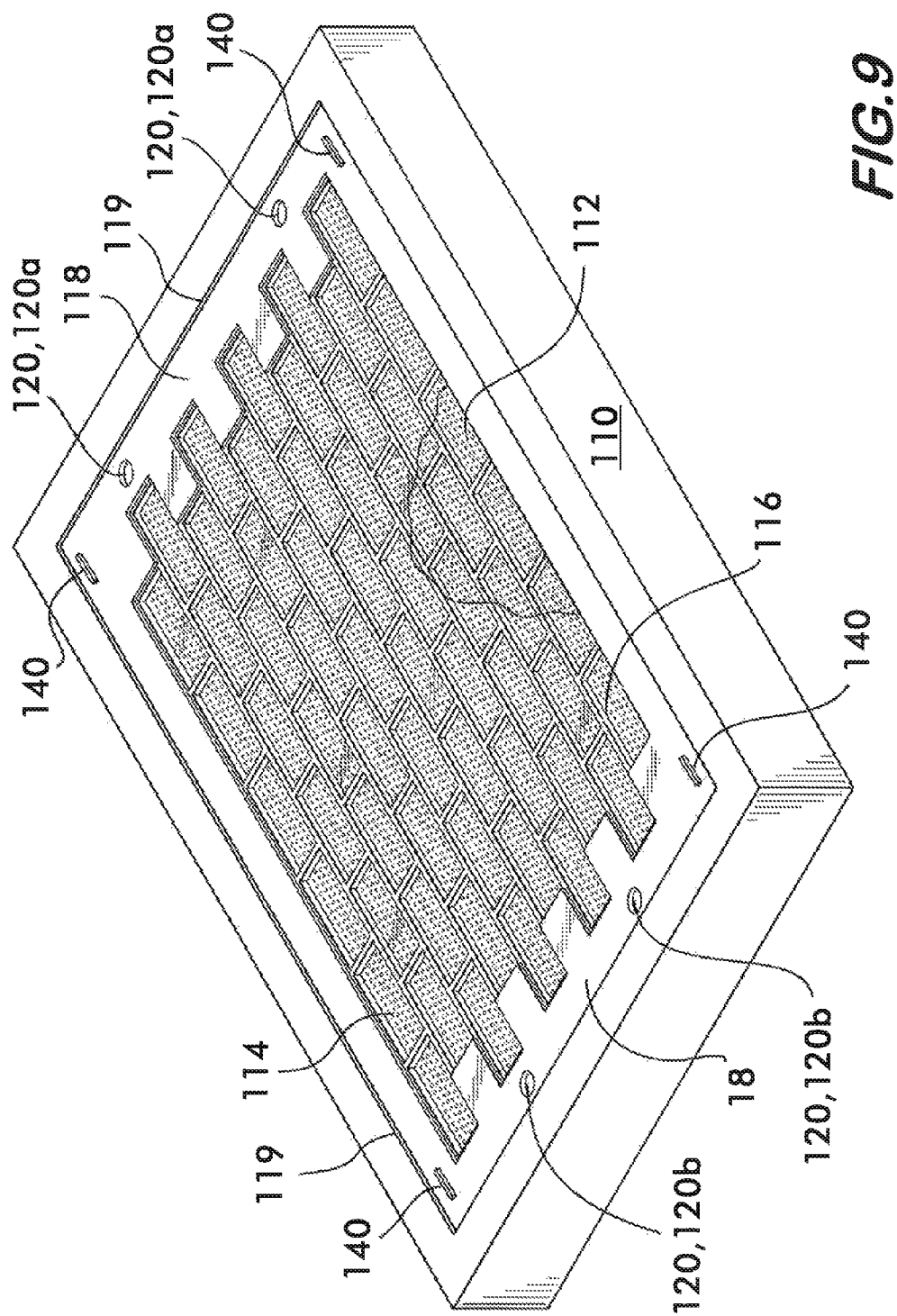
FIG. 9 is a perspective view of a mold used to prepare the panel member shown in FIG. 8.

Referring now to FIG. 9, an apparatus for molding panel members 200 from a fibrous slurry, generally designated 300, of the subject invention is shown. For the sake of brevity, like parts of the a die 110 having molding screen 112, and a vacuum mechanism 130 for drawing slurry into the die 110 and further extracting water away from the slurry, as previously discussed and shown in FIG. 7, will be omitted and only those features that are distinguished from the embodiment shown in FIG. 9 will be described.

In particular, the die 110 includes extended exterior filler walls 118 that provide more distance between the interior filler walls 116, which produce the ornamental sections of the panel member 200, and the support wall 119. As a result, a plurality of die cutting locator forms 120 and a plurality of dimensional calibrator forms 140 are provided along the exterior filler walls 118.

In the shown embodiment, the plurality of die cutting locator forms 120 are notches formed in the die 110 and, in particular, along opposite sides thereof. Each die cutting locator forms 120 extends outward from a top surface of the exterior filler walls 118. In the exemplary embodiment, each die cutting locator forms 120 is shaped as a cylindrical recess that forms the die cutting locator 220, as described above. However, each die cutting locator forms 120 could be formed from other shapes, and is shaped so that the die cutting locator 220 corresponds with the locator receiving notches in the cutting die (not shown). As a result, the die cutting locator forms 120 dimensions can vary, and depend on the shape and placement of the die cutting locator 220.

As shown in FIG. 9, the die cutting locator forms 120 extends into the die 110 from the top surface. However, in another embodiment, it is possible that the die cutting locator forms 120 extends upward from the upper surface of the exterior filler walls 118. In another embodiment, where the die cutting locator 220 is a recess, the die cutting locator forms 120 would extend to a height to or above the support wall 119.

In the shown embodiment, the die 110 includes two pairs of die cutting locator forms 120, including a first pair of die cutting locator forms 120a on a first side of the die 110, and a second pair of die cutting locator forms 120b positioned on a second side of the die 110, which is opposite the first side. The first pair of die cutting locator forms 120a are positioned apart from each by a separation distance, which is larger than a separation distance between the second pair of die cutting locator forms 120b, which too are positioned separate from each other. This provides asymmetrically positioning of the die cutting locators 220.

Now with reference back to FIG. 9, the plurality of dimensional calibrator forms 140 are shown, and also positioned along the exterior filler walls 118. In particular, in the shown embodiment, each dimensional calibrator forms 140 is positioned adjacent corners of the die 110 and separate from the plurality of die cutting locator forms 120. In particular, each dimensional calibrator forms 140 is positioned along the four corners of the exterior filler walls. 118.

As shown in FIG. 9, each dimensional calibrator form 140 is an elongated protrusion extending upward from the exterior filler wall 118. In the exemplary embodiment, the dimensional calibrator form 140 is dimensioned to match the width of a tape measure or an equivalent. However, the dimension and shape of the dimensional calibrator form 140 can vary. For instance, the dimensional calibrator form 140 could be an elongated recess extending across the exterior filler wall 118, or even a larger protuberance that extends to a height of the support wall 119 so that the dimensional calibrator 240 is a recess in the panel member 200.

Now with reference to FIGS. 1-9, a method of producing panel members 1, 200 from a fibrous slurry of the invention will be discussed. Firstly, the die 110 comprising a water insoluble, porous (i.e. screen 112 and perforations 114), and relatively rigid and easily shaped material is provided, having a molded surface through a series of walls that replicates a structure prepared from masonry, carpentry, or other finishes. The die 110 is then disposed into a vat having a fibrous slurry. The vacuum mechanism 130, connected to the die 110, draws the fibrous slurry against the screen 112 and molding surface of the die 110 to form a substantially uniform layer of fibrous material. The water is drawn through the perforations 114 in the die 110. The vacuum pressure necessary for drawing the fibrous slurry against the molding surfaces of the forming die may be readily determined by one of ordinary skill in the art and will depend on various process conditions such as the composition and viscosity of the slurry, the temperature of the slurry, and the configuration and wall thickness of the article to be produced.

In one embodiment, when a fibrous layer has been deposited at the desired thickness, the panel member 1, 200 is removed for subsequent steps of manufacturing, including drying of the panel member 1, 200 in a temperature controlled environment (i.e. oven).

For panel members 200 having dimensional calibrators 240, an operator may measure the dimensional calibrators 240 in order to determine a baseline measurement for the molded panel member 200.

After the panel member 1 has dried sufficiently, it may be removed from the die 110 by hand or mechanically with the application of air pressure through the die 110 to push the panel member 1 away from the die 110. In order to reduce drying time, the panel member 1 may be placed into a conventional oven having a temperature of less than about 500 degrees. The amount of time and the particular heating temperature may be readily determined by one of ordinary skill in the art.

The operator can continue to measure the dimensional calibrators 240 so that the operator can determine is adjustments to the drying techniques are required to avoid over-shrinkage or warping of the panel member 200. For instance, the operator may determine that a right side of the panel member 200 is shrinking faster than a left side. As a result, the operator can change the direction and intensity of the temperature affecting the panel member 200 during the drying process. The measurement of the dimensional calibrators can performed throughout the drying process, subsequent manufacturing steps, and during storage, after which the dimensional calibrator 240 may be removed by the cutting die before use by a consumer.

During die cutting, the panel member 200 is matched with the cutting die using the plurality of die cutting locators 220. Since the die cutting locators 220 are staggered and asymmetrically positioned along the panel member 200, the panel member 200 will only fit when properly aligned with cutting die.

Once the die cutting locators 220 are properly aligned, the panel member 200 is cut, and the flashing is removed. The panel member 200 now has consistent edging so that adjoin panel members 200 can seamlessly join each other along corresponding finger joints 30.

Although several embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A blank, comprising:
    a body prepared from a substantial uniform caliper of fiber material, the body having:
        a plurality of ornamental sections extending outward from the body;
        a plurality of interior filler sections positioned between the plurality of ornamental sections;
        an exterior filler section positioned along a perimeter of the body and extending outward from the plurality of ornamental sections and the plurality of interior filler sections; and
        a plurality of quality control elements disposed along and extending outward a planar surface of the exterior filler section.

2. The blank according to claim 1, wherein a thickness of the exterior filler section is substantially equal to a thickness of the plurality of interior filler sections.

3. The blank according to claim 1, wherein the plurality of quality control elements include a first die cutting locator positioned on one side of the exterior filler section and a second die cutting locator positioned opposite and asymmetrical to the first die cutting locator with respect to a center axis separating two halves of the body.

4. The blank according to claim 3, wherein the first die cutting locator is positioned between an edge of the exterior filler section and an edge of a finger joint.

5. The blank according to claim 1, wherein the second die cutting locator extends outward from the planar surface of the exterior filler section.

6. The blank according to claim 3, wherein the plurality of quality control elements further include a dimensional calibrator positioned along the exterior filler section.

7. The blank according to claim 6, wherein the dimensional calibrator is positioned adjacent a corner of the exterior filler section and separate from the first and second pair of die cutting locators.

8. The blank according to claim 6, wherein the dimensional calibrator is an elongated indentation formed in the exterior filler section.

9. The blank according to claim 1, wherein the plurality of quality control elements include a first pair of die cutting locators positioned adjacent a first set of finger joints and a second pair of die cutting locators positioned adjacent a second set of finger joints opposite the first set of finger joints.

10. The blank according to claim 9, wherein the first pair of die cutting locators are positioned apart from each other along an opposite side of the body.

11. The blank according to claim 10, wherein the second pair of die cutting locators are positioned closer to each other than the first pair of die cutting locators.

12. The blank according to claim 9, wherein the plurality of quality control elements further include a dimensional calibrator positioned along the exterior filler section.

13. The blank according to claim 12, wherein the dimensional calibrator is positioned adjacent a corners of the body and separate from the first and second pair of die cutting locators.

14. The blank according to claim 12, wherein the dimensional calibrator is an elongated indentation formed in the exterior filler section.

15. The blank according to claim 1, wherein the plurality of quality control elements includes a plurality of dimensional calibrators positioned along the exterior filler section.

16. The blank according to claim 15, wherein each of the plurality of dimensional calibrators are positioned adjacent corners of the body.

17. The blank according to claim 16, wherein each of the plurality of dimensional calibrators is an elongated indentation formed in the exterior filler section.

18. The blank according to claim 2, wherein the fiber material is a pulp slurry using pre- and post-consumer paper mixed with water.

19. The blank according to claim 18, wherein the paper is reduced to small pieces and then further defibered into a homogenized slurry of paper and water, sizing agents, and binders.

* * * * *